US010001066B2

(12) United States Patent
Emmet et al.

(10) Patent No.: US 10,001,066 B2
(45) Date of Patent: Jun. 19, 2018

(54) ROTARY ACTUATOR FOR VARIABLE GEOMETRY VANES

(71) Applicant: General Electric Company, Schenectady, NY (US)

(72) Inventors: Peter Mihailovitch Emmet, Melrose, MA (US); William James Mailander, Beverly, MA (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 14/818,813

(22) Filed: Aug. 5, 2015

(65) Prior Publication Data

US 2016/0061117 A1    Mar. 3, 2016

Related U.S. Application Data

(60) Provisional application No. 62/043,131, filed on Aug. 28, 2014.

(51) Int. Cl.
*F02C 9/20*     (2006.01)
*F01D 17/16*    (2006.01)
(Continued)

(52) U.S. Cl.
CPC .............. *F02C 9/20* (2013.01); *F01D 17/162* (2013.01); *F01D 17/26* (2013.01); *F02C 3/04* (2013.01);
(Continued)

(58) Field of Classification Search
CPC .......... F15B 15/12; F01D 17/10; F01D 17/14; F01D 17/16; F01D 17/162; F01D 17/22;
(Continued)

(56) References Cited

U.S. PATENT DOCUMENTS 4,655,695 A * 4/1987 Bender .................. F15B 15/12
418/34
5,996,523 A 12/1999 Fox
(Continued)

FOREIGN PATENT DOCUMENTS

CN     1482345 A     3/2004
CN     102128179 A    7/2011
(Continued)

OTHER PUBLICATIONS

Japanese Office Action Issued Connection with corresponding JP Application No. 2015162359 dated Jul. 19, 2016.
(Continued)

*Primary Examiner* — Woody Lee, Jr.
*Assistant Examiner* — Sang K Kim
(74) *Attorney, Agent, or Firm* — General Electric Company; Pamela Kachur

(57) ABSTRACT

A rotary actuator for control of variable geometry vanes is provided. The actuator is rotary so that operating components are internalized to protect fuel from contamination. The rotary actuator is a self-contained unit so that the device may be removed from the gas turbine engine without requiring removal of additional fuel system components. Finally, some embodiments of the rotary actuator may comprise multiple actuator loops to provide adjustment for two or more rows of vanes, independently.

18 Claims, 7 Drawing Sheets

(51) Int. Cl.
  *F01D 17/26* (2006.01)
  *F04D 29/56* (2006.01)
  *F02C 3/04* (2006.01)
  *F04D 27/02* (2006.01)

(52) U.S. Cl.
  CPC ....... *F04D 27/0246* (2013.01); *F04D 29/563* (2013.01); *F05D 2260/406* (2013.01); *F05D 2260/56* (2013.01); *F05D 2270/64* (2013.01); *F05D 2270/66* (2013.01)

(58) Field of Classification Search
  CPC .... F01D 17/26; F02C 3/04; F02C 9/20; F02C 9/22; F04D 27/0246; F04D 29/563; F05D 2260/406; F05D 2260/56; F05D 2270/64; F05D 2270/66
  See application file for complete search history.

(56) References Cited

U.S. PATENT DOCUMENTS

| | | |
|---|---|---|
| 6,385,959 B1 | 5/2002 | Montoya |
| 8,066,474 B1 | 11/2011 | Jansen et al. |
| 8,235,655 B1 | 8/2012 | Pankey et al. |
| 2004/0022624 A1 | 2/2004 | Harrold et al. |
| 2009/0226305 A1 | 9/2009 | Wong et al. |
| 2011/0176913 A1 | 7/2011 | Wassynger et al. |
| 2012/0237379 A1 | 9/2012 | Glynn et al. |
| 2012/0269613 A1* | 10/2012 | Mills ............... F01D 17/162 415/48 |
| 2012/0308364 A1 | 12/2012 | Hofmann |
| 2013/0283762 A1 | 10/2013 | Simpson et al. |
| 2015/0240827 A1* | 8/2015 | Hoemke ............ F01D 17/26 415/1 |
| 2016/0024959 A1* | 1/2016 | Do ............... F01D 17/162 415/1 |

FOREIGN PATENT DOCUMENTS

| | | |
|---|---|---|
| EP | 1101902 A2 | 5/2001 |
| WO | 2014133724 A1 | 9/2014 |
| WO | 2015130938 A1 | 9/2015 |

OTHER PUBLICATIONS

European Search Report and Opinion issued in connection with corresponding EP Application No. 15182231.9 dated Jan. 25, 2016.

Machine translation and Office Action issued in connection with Corresponding CN Application No. 201510538116.5 dated May 4, 2017.

Canadian Office Action issued in connection with corresponding CA Application No. 2901257 dated May 29, 2017.

* cited by examiner

ROTARY ACTUATOR FOR VARIABLE GEOMETRY VANES

CROSS-REFERENCE TO RELATED APPLICATIONS

This non-provisional application claims the benefit of priority under 35 U.S.C. § 119(e) to U.S. Provisional Patent Application No. 62/043,131, entitled "ROTARY ACTUATOR FOR VARIABLE GEOMETRY VANES", filed Aug. 28, 2014, which is herein incorporated in its entirety by reference.

BACKGROUND

Present embodiments relate generally to actuation of vanes in a gas turbine engine. More specifically, present embodiments relate to, without limitation, a rotary actuator for actuation of one or more rows of guide vanes of a gas turbine engine.

In a gas turbine engine, air is pressurized in a compressor and mixed with fuel in a combustor for generating hot combustion gases which flow downstream through turbine stages. Gas turbine engines generally possess a forward end and an aft end with several core or propulsion components positioned axially there between. An air inlet or intake is located at a forward end of the engine. Moving toward the aft end, in serial flow communication, the intake is followed by a compressor, a combustion chamber, and a turbine. It will be readily apparent to those skilled in the art that additional components may also be included in the engine, such as, for example, low-pressure and high-pressure compressors, and high-pressure and low-pressure turbines. This, however, is not an exhaustive list.

The compressor and turbine generally include rows of airfoils that are stacked axially in stages. Each stage includes a row of circumferentially spaced stator vanes and a row of rotor blades which rotate about a center shaft or axis of the turbine engine. The compressor may include a series of adjustable airfoils, commonly referred to as vanes, to vary flow characteristics of the compressed air moving through the compressor blades. Similarly, the turbine may include rows of adjustable or static vanes, or a combination thereof, interspaced in the engine axial direction between rotating airfoils commonly referred to as blades.

An engine also typically has a first high pressure shaft axially disposed along a center longitudinal axis of the engine. The high pressure shaft extends between the high pressure turbine and the high pressure air compressor, such that the turbine provides a rotational input to the air compressor to drive the compressor blades. A second low pressure shaft joins the low pressure turbine and the low pressure compressor. The low pressure second shaft may also drive a fan which creates thrust for an aircraft in flight. This connection with the low pressure shaft may be direct or indirect, for example through a gearbox.

In operation, air is pressurized in a compressor and mixed with fuel in a combustor for generating hot combustion gases which flow downstream through turbine stages. A high pressure turbine first receives the hot combustion gases from the combustor. As the combustion gas flows downstream through the turbine stages, energy is extracted therefrom and the pressure of the combustion gas is reduced. The turbine stages extract energy from the combustion gases by converting the combustion gas energy to mechanical energy. In turn, the turbine provides a rotational input to the air compressor to drive the compressor blades. This powers the compressor during operation and subsequently continues driving the turbine.

In the area of the gas turbine engine, various stages of vanes are used to provide desired flow characteristics to the compressor and turbine rotor blades. Some of the vanes may be of a variable geometry, meaning they are actuatable between multiple positions to adjust airflow into the compressor and/or the turbine. For example, at start up and shortly thereafter, it may be desirable to limit airflow into the compressor so that proper amounts of airflow are present for ignition in the combustor. However, at cruise conditions, it may alternatively be desirable to increase the amount of airflow to the compressor and combustor once the engine is at higher operating temperature and is burning higher amounts of fuel. Similarly, a still further amount of airflow may be desirable at take-off.

The prior art has used linear piston actuation for adjustment of vanes. Prior art vane actuators are in many cases integrated with the fuel metering system such that accessing the actuator would first require removal of the fuel metering unit. Additionally, with a piston actuator, the extension of the piston results in exposure of the piston which must rely on a piston seal to inhibit contamination of the actuator. Further, piston actuators have been typically arranged with one single actuator for multiple stages. Therefore, independent actuation of stages is more complicated.

As may be seen by the foregoing, it would be desirable to improve these functions and structures within gas turbine engine components.

The information included in this Background section of the specification, including any references cited herein and any description or discussion thereof, is included for technical reference purposes only and is not to be regarded subject matter by which the scope of the instant embodiments are to be bound.

SUMMARY

According to aspects of the present embodiments, a rotary actuator for control of variable geometry vanes is provided. The actuator is rotary so that operating components are internalized to protect fuel from such contamination. The rotary actuator is separated from the fuel metering unit so that the rotary actuator may be removed from the gas turbine engine without requiring removal of the fuel metering unit. Finally, some embodiments of the rotary actuator may comprise multiple actuator loops to provide adjustment for two or more rows of vanes, independently.

According to some embodiments, a rotary variable geometry (VG) actuator assembly for at least one stage of vanes within a gas turbine engine comprises at least one actuator loop having at least one first fuel control port and at least one second fuel control port for fluid communication with at least one fuel supply. The at least one first actuator loop may have a plurality of fluid ducts, a rotor and at least one first housing in fluid communication with the at least one first fuel control port and the at least one second fuel control port. The housing may have rotary motion driven by fuel in either of a first direction or a second direction. A first actuator linkage may be operably connected to the first actuator loop, wherein the fuel develops a pressure differential across the at least one first actuator loop to drive the housing and actuate the at least one stage of vanes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the rotary actuator for control of variable geometry vanes may be gleaned from the disclosure herein. Therefore, no limiting interpretation of this Summary is to be understood without further reading of the entire specification, claims, and drawings included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE ILLUSTRATIONS

The above-mentioned and other features and advantages of these exemplary embodiments, and the manner of attaining them, will become more apparent and the rotational actuator for control of variable geometry vanes will be better understood by reference to the following description of embodiments taken in conjunction with the accompanying drawings, wherein.

DETAILED DESCRIPTION

Figure 1:
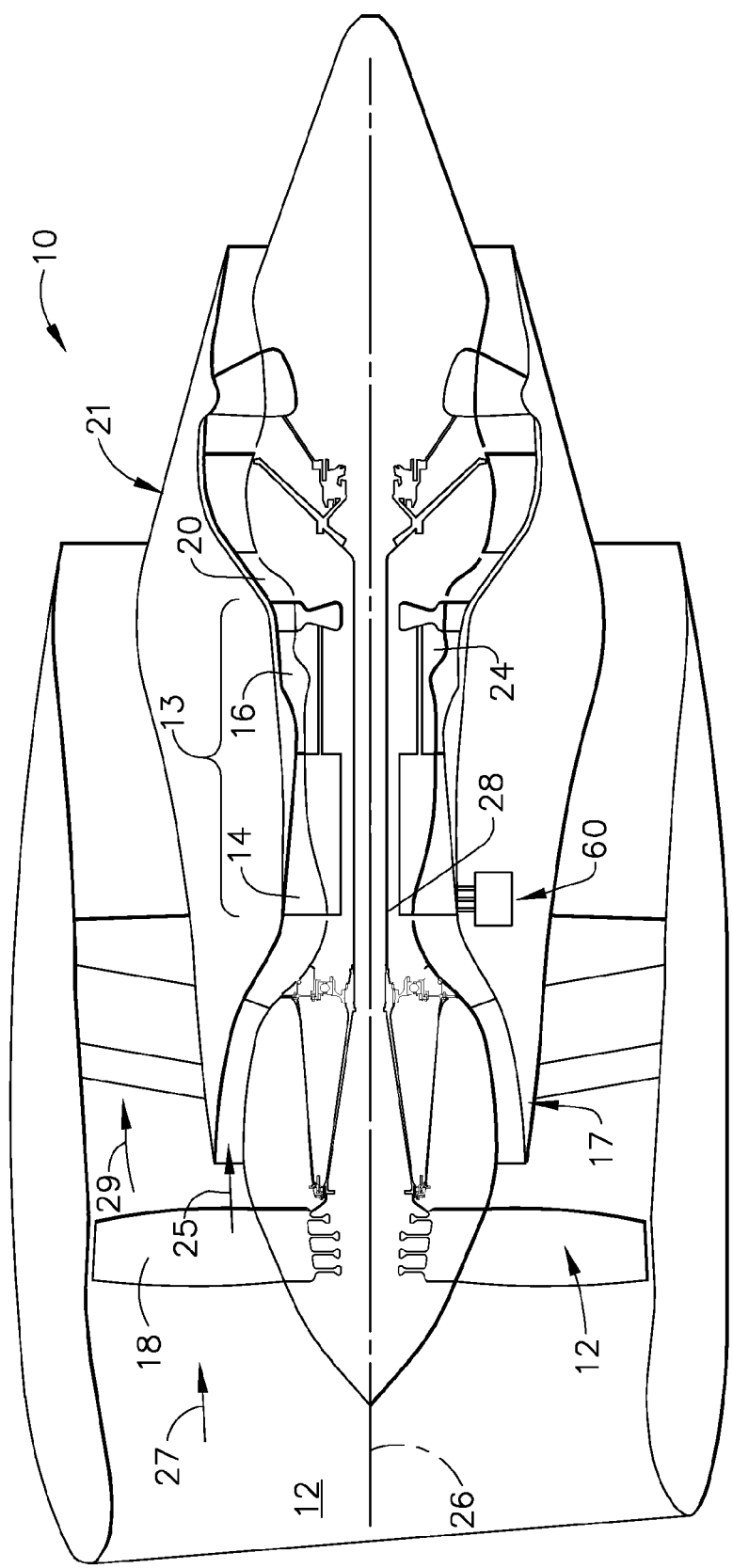
FIG. 1 is a cross-sectional view of an exemplary gas turbine engine wherein a rotary actuator for control of variable geometry vanes may be utilized.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present disclosure covers such modifications and variations as come within the scope of the appended claims and their equivalents.

Referring to FIGS. 1-7 various embodiments of a rotary actuator assembly for variable geometry vanes are provided. The rotary actuator assembly provides a self-contained hardware unit that may be removed from the gas turbine engine without requiring additional removal of fuel system components. The rotary actuator further provides internalized hardware which inhibits contamination during operation of the actuator. The one or more actuators may be formed in a single assembly to actuate one or more rows of vanes in unison or independently. Finally, the actuator may provide equal torque in two directions of rotary motion which is difficult to achieve.

Referring initially to FIG. 1, a schematic side section view of a gas turbine engine 10 is shown having an engine inlet end 12 from which air enters the propulsor core 13 which is defined generally by a high pressure compressor 14, a combustor 16 and a multi-stage high pressure turbine 20. Collectively, the propulsor core 13 provides power during operation. Although the gas turbine engine 10 is shown in an aviation embodiment, such example should not be considered limiting as the gas turbine engine 10 may be used for aviation, power generation, industrial, marine or the like.

The gas turbine engine 10 is axisymmetrical about engine axis 26 so that various engine components rotate thereabout. An axisymmetrical high pressure shaft 24 extends between a forward end and an aft end of the gas turbine engine 10 and is rotatably supported by bearings along the axial length of the shaft structure. The high pressure shaft 24 rotates about an engine axis 26 of the gas turbine engine 10. The high pressure shaft 24 may be hollow to allow rotation of a low pressure shaft 28 therein and independent of the rotation of high pressure shaft 24. The low pressure shaft 28 also may rotate about the engine axis 26 of the engine and extends between a low pressure turbine 21 and a low pressure compressor 17. During operation, the high and low pressure shafts 24, 28 rotate along with other structures connected to the shafts such as the rotor assemblies of the high and low pressure turbines 20, 21 and the high and low pressure compressors 14, 17 in order to create power for various types of operations.

In operation, primary air flow 27 enters through the engine inlet end 12 of the gas turbine engine 10 and separates defining either of two flows. In one path, a by-pass airflow 29 moves exterior to the propulsor core 13, for example to provide thrust of aviation embodiments. Alternatively, a smaller portion of primary air flow 27 defines a air flow 25 wherein the air moves through at least one stage of compression so that the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of a rotor and turbine blades which in turn cause rotation of a high pressure shaft 24. The high pressure shaft 24 extends forward toward the front of the gas turbine engine 10 to continue rotation of the blades of the one or more stages of the high pressure compressor 14. The low pressure turbine 21 may also be utilized to extract further energy and power one or more stages of a low pressure compressor 17. A fan 18 is connected by the low pressure shaft 28 to the low pressure turbine 21 and the low pressure compressor 17 to create thrust for the gas turbine engine 10. This connection may be direct connection or indirect through a gearbox or other transmission. The pressurized air may be used to aid in cooling components of the gas turbine engine 10 as well.

Figure 2:
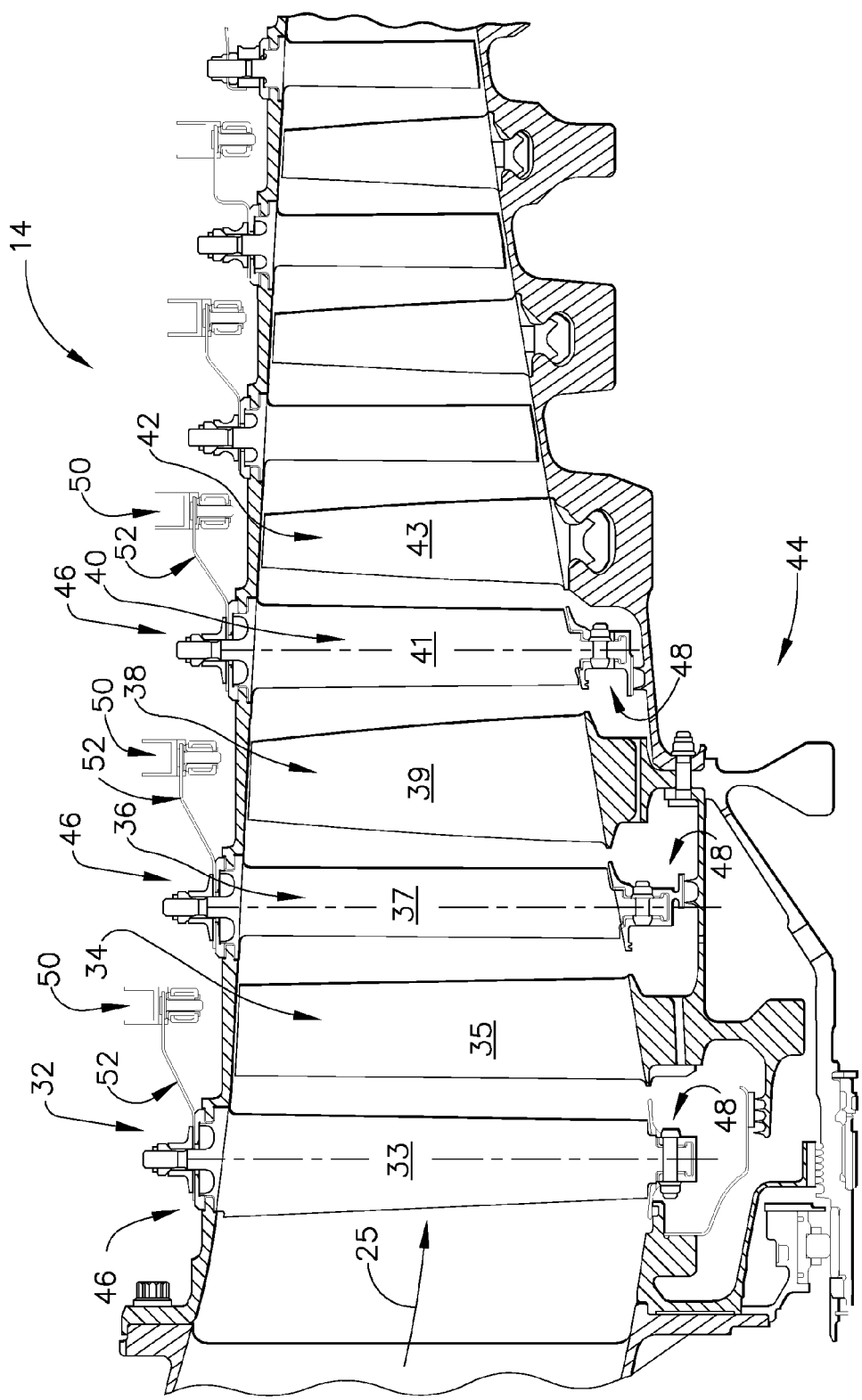
FIG. 2 is a section view of an exemplary compressor having multiple stages of vanes and blades.

Referring now to FIG. 2, an axial cross-section of an exemplary high pressure compressor 14 is shown. The rows or stages of vanes and blades are concentrically located about the engine axis 26 (FIG. 1) of the gas turbine engine 10. At the forward end of the high pressure compressor 14, air flow 25 first engages in serial flow communication at row 32 of inlet guide vanes 33, followed by a first row 34 of blades 35, a row 36 of first stage vanes 37, a second row 38 of blades 39, a row 40 of second stage vanes 41 and a third row 42 of blades 43. The vanes 33, 37, 41 are referred to as variable geometry vanes due to their ability to pivot or rotate relative to air flow 25 and therefore, change the geometry seen by the air flow 25.

Individual blades are loaded into substantially axially-oriented slots or grooves formed in the rotor 44. For example, with regard to the first row 34 of blades 35, each blade 35 may be retained in the slots or grooves so as to prevent any radial or axial movement of the blades 35 during operation of the high pressure compressor 14. For example, dovetail mountings on the blades and complimentary dovetail slots in the rotor 44 may serve to prevent radial movement of the blades. Alternatively, the blades may be integrally formed with disks in an arrangement referred to in the industry as blisks. Compressor blades may be forged from superalloys such as a nickel-base alloy however, this is one non-limiting example as other materials may be used.

On forward and aft sides of the rows 34, 38, 42 of blades 35, 39, 43 are the rows 32, 36, 40 of variable geometry vanes 33, 37, 41. Air flow 25 moves serially through inlet guide vanes 33, the first row 34 of blades 35, the first stage guide vanes 37, second row 38 of blades 39, second stage vanes 41 and third row 42 of blades 43 and so on. The rows 32, 36, 40 are defined by guide vanes 33, 37, 41 respectively. Each of the rows 32, 36, 40 extends circumferentially about the gas turbine engine 10.

The vanes 33, 37, 41 are pivotally mounted within the high pressure compressor 14 so that each of the vanes 33, 37, 41 can pivot about an axis as shown in broken line which extends radially from within the gas turbine engine 10. The axes may alternatively be at an angle to a purely radial axis. The pivoting mounts 46, 48 of the exemplary vanes 33, 37, 41 are located at the radially inner and outer ends of the vanes 33, 37, 41. The pivotal mounting allows for the variable geometry of the rows 32, 36, 40 of vanes 33, 37, 41. It is desirable that the vane geometry be adjustable or variable to vary either or both of flow rate or flow volume of the air flow 25 moving through the propulsor core 13. For example, in some operating conditions, it may be desirable to limit airflow through the propulsor core 13 for example at start up, so not to introduce too much air to the combustor 16 (FIG. 1) causing a flame-out condition. Similarly, in flight if a gas turbine engine 10 flames out and must be restarted, it may be desirable to limit air flow 25 to the combustor 16 (FIG. 1) to allow re-start and inhibit flame-out. Alternatively, once the gas turbine engine 10 is warmed up to operating temperature or at cruise condition, higher air flow 25 may be desirable. Still further, at take-off condition, even more air flow 25 may be desirable. One means for controlling the flow of air flow 25 to the combustor 16 and through the high pressure compressor 14 is to adjust the positions of the vanes 33, 37, 41. Further, it may be desirable to adjust flow rate through the high pressure compressor 14 and this may be controlled with adjustment of the vanes 33, 37, 41. The positional adjustment is pivotal about the axes extending from the radial outer end to the radial inner end of each of the vanes 33, 37, 41.

At radially outer ends of the vanes 33, 37, 41 are the pivoting mounts 46 providing, in part, the pivoting motion of the vanes. Extending from the mounts 46 are arms 52 which connect to a unison ring 50. The unison ring 50 moves circumferentially, into or out of the depicted figure, causing movement of the arms 52. At a first end of the arm 52, at the unison ring 50, the arm 52 translates. At an opposite end, the arm 52 rotates at the connection with the vanes 33, 37, 41. Thus, each arm 52 is connected to a vane 33, 37, 41 to rotate the vanes by way of movement of the unison ring 50. This adjustability of the vanes 33, 37, 41 provides the varying geometry.

Figure 3:
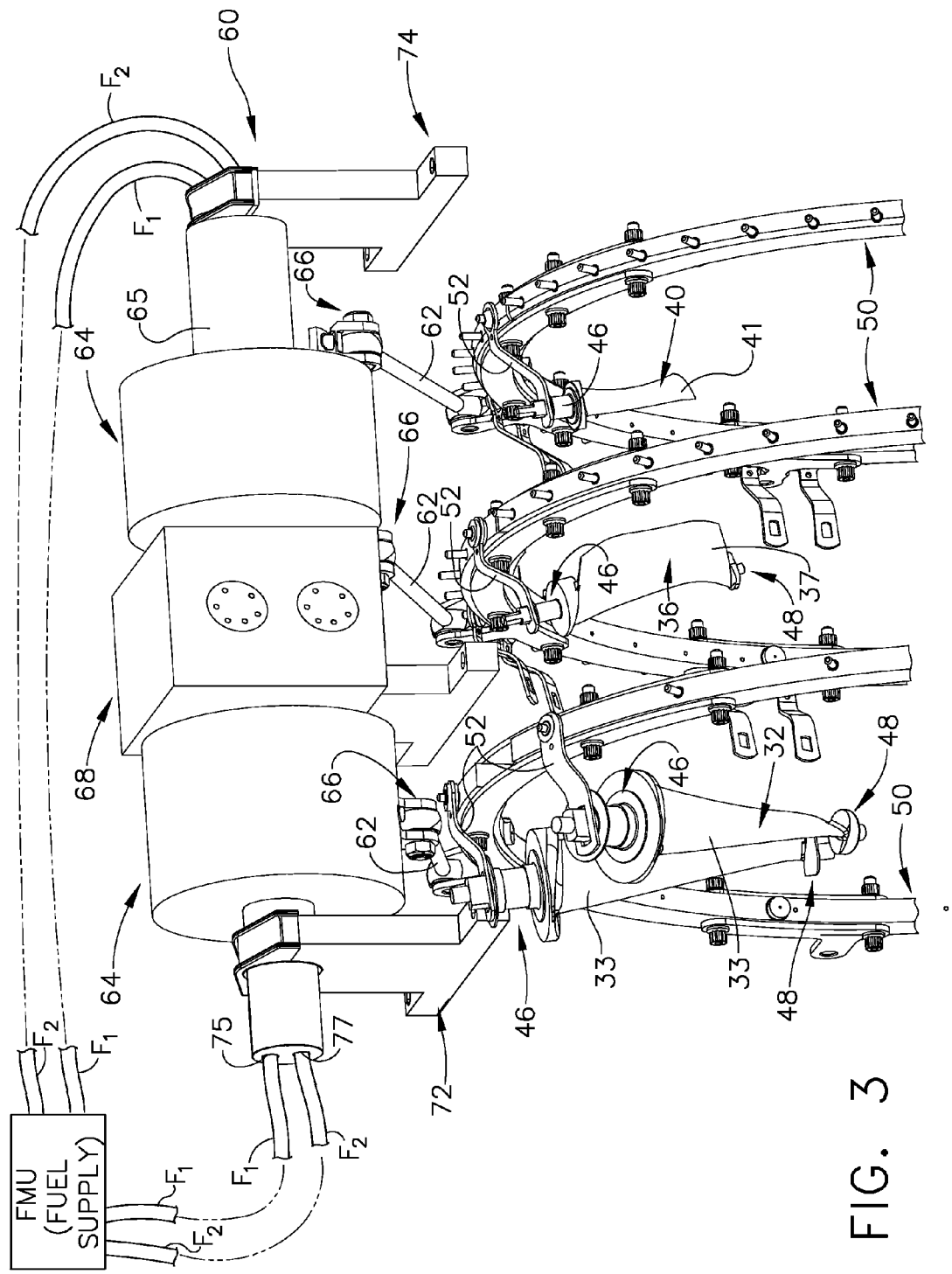
FIG. 3 is a perspective view of multiple vane stages operably connected to an exemplary rotary actuator.

Referring now to FIG. 3, a perspective view of a rotary actuator assembly 60 is shown in combination with portions of the row 32 of the inlet guide vanes 33, row 36 of first stage vanes 37, and row 40 of second stage vanes 41. Adjacent to each of the rows 32, 36, 40 is the unison ring 50, each of which extends circumferentially about the engine axis 26 (FIG. 1). The unison ring 50 receives input motion from the rotary actuator assembly 60 and causes motion of the rows 32, 36, 40 of vanes 33, 37, 41. Each unison ring 50 is connected by at least one actuator linkage 62 to the rotary actuator assembly 60. The rotary actuator assembly 60 moves the actuator linkage 62 causing the movement of the unison ring 50. In turn, translation of the unison ring 50 causes translation of one end of the arms 52 connected to the unison ring 50 and rotational movement of the opposite end of the arms 52 at the vanes 33, 37, 41. This further creates rotation of the vanes 33, 37, 41. The linkage 62 may be defined by one structure or multiple structures to connect the rotary housing 64 with the unison ring 50. The exemplary linkage 62 includes eyelets at ends to connect to the corresponding clevises of the rotary housing 64 and the unison ring 50. However, this is not limiting as other connection structures may be utilized.

The rotary actuator assembly 60 includes at least one rotary housing 64. In the exemplary embodiment, two rotary housings 64 are shown. The rotary housing 64 includes at least one clevis 66, which connects to the actuator linkage 62. In the exemplary embodiments, the rotary actuator assembly 60 may include one or more housings 64 which rotate to control one of more rows 32, 36, 40 of vanes. Each rotary housing 64 may correspond to one or more rows of vanes. The rows 32, 36, 40 may be controlled independently in distance and direction in embodiments where two or more rows are controlled, or they may be controlled in the same distance and direction. For example, multiple clevises 66 may be placed on one rotary housing 64 or multiple rotary housings 64.

The at least one rotary housing 64 is operably connected to a shaft mount 68 such that a shaft 65 extends through the rotary housing 64 and into the shaft mount 68. The shaft 65 is fixed so that the rotary housing 64 rotates about the shaft 65. When the rotary housing 64 rotates, the clevis 66 moves with the rotary housing 64 to cause rotation of the rows 32, 36, 40 of vanes 33, 37, 41, as previously described. As also noted in this figure, the rotation of rotary housing 64 is not co-axial with the rotation of vanes 33, 37, 41. For example, the rotation of rotary housings 64 is about an axis which is parallel to the engine axis 26. However, the axis about which the vanes 33, 37, 41 turn are radially extending or at an angle to a purely radial direction. The shaft mount 68 may further comprise a mount 72, 74 which is connected to a fixed structure and inhibits rotation of the shaft mount 68. One or more additional mounts 72, 74 may be provided.

The rotary actuator assembly 60 also comprises a plurality of control ports 75, 77 which receive fuel, or other hydraulic fluid, from fuel lines $F_1$, $F_2$. The fuel lines $F_1$, $F_2$ are in fluid communication with a remote fuel metering unit (FMU) or other such fuel supply which is separate from the rotary actuator assembly 60. The instant embodiments may utilize fuel for driving the rotary actuator assembly 60 and will be described as such for clarity however other fluids may be used. As the control ports 75, 77 receive input fuel and pass output fuel, the fuel passes through numerous chambers, tubes, ducts or otherwise passageways, in order to move fuel from the control ports 75, 77 to the interior of the rotary housings 64. The control ports 75, 77 may be located at various locations of the rotary actuator assembly 60. For example, the ports 75, 77 may be located as shown in FIG. 3 at axial ends of the rotary actuator assembly 60 or alternatively, may be located at other positions. For example, with brief reference to FIG. 6, the ports 75, 77 are schematically represented along the length of the rotary actuator assembly 60, but not at the axial ends, extending in a radial direction relative to the rotary actuator assembly 60. The fuel is provided flow communication from an electrohydraulic servo valve (EHSV) (not shown). The EHSV directs an amount of fuel from the fuel metering unit to the rotary actuator assembly 60 for rotation of the rotary housing 64 in adjusting the vanes 33, 37, 41.

Figure 4:
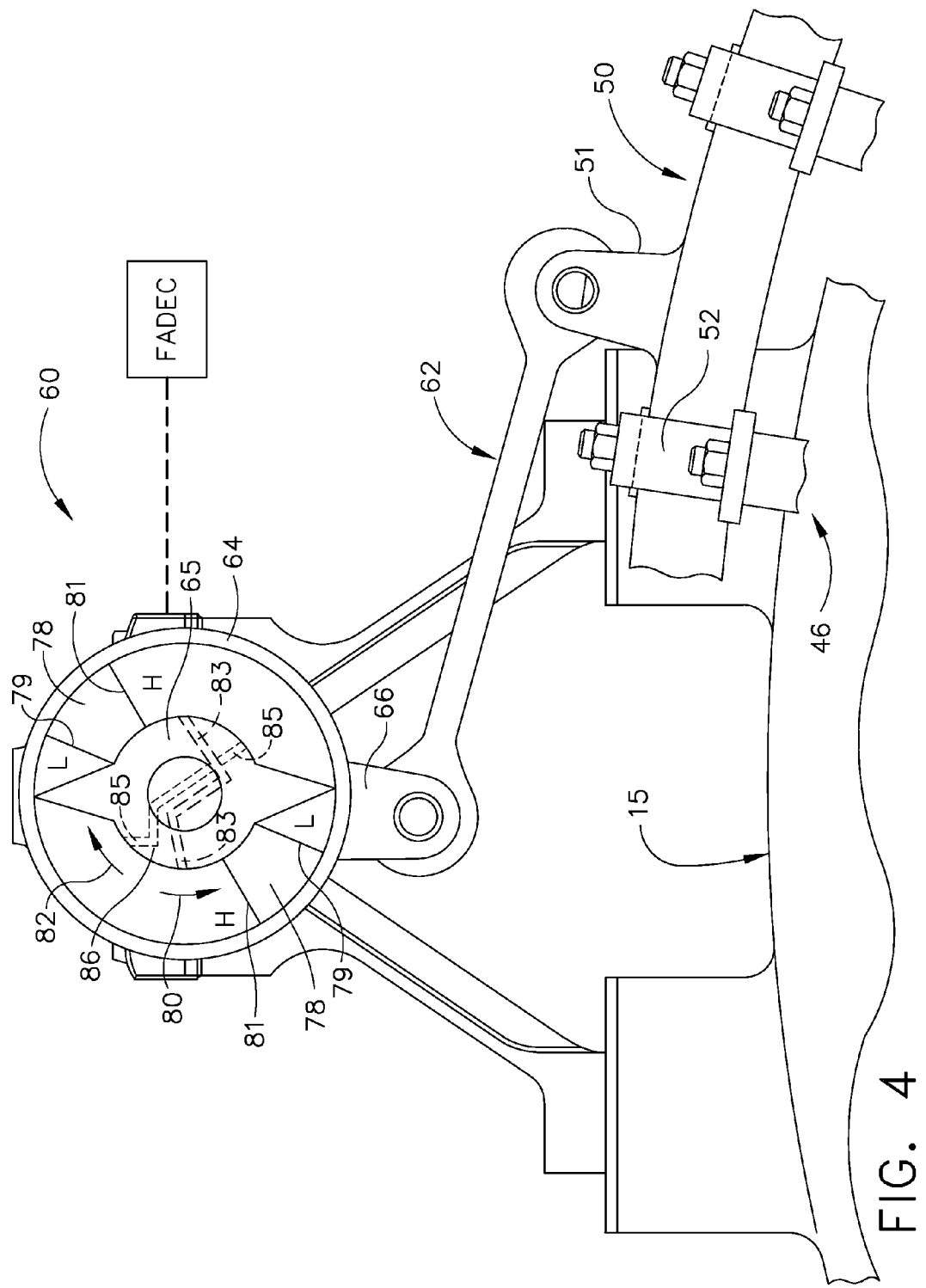
FIG. 4 is an end section view of a rotary actuator including a linkage connecting the rotary actuator and one stage of vanes.

Referring now to FIG. 4, a sectional schematic view of the rotary actuator assembly 60 revealing an interior of the rotary housing 64. Within the rotary housing 64 is at least one rotor 78, which is connected to the rotary housing 64. In the exemplary embodiment, two rotors 78 are shown each having two surfaces 79, 81. Each surface 79, 81 has an equivalent surface area so that force on either surface provides equivalent torque in either direction. As fuel moves through the rotary actuator assembly 60, the fuel enters the rotary housing 64 from the chambers, tubes, ducts, or other passageways, engages the rotors 78 and causes rotation of the rotary housing 64.

In the sectional view, the rotor 78 receives fuel causing rotation of the rotor 78 and the rotary housing 64. The rotary housing 64 may include at least two interior ports to receive fuel into the rotary housing 64 and at least one to output fuel from the rotary housing 64. The at least two interior ports may be directed in different directions so as to cause rotation in two opposite directions as shown by arrows 80, 82. Also shown in the figure are H, L labels representing high and low pressures. In rotating the rotary housing 64 in the direction 80, the high pressure of the fuel is applied on the surfaces 81 of rotors 78 closest to the Hs. In rotating the rotary housing 64 in the opposite direction 82, the high pressure fuel will be engaging the opposite surfaces 79 of rotors 78.

As shown in FIG. 4, the first and second interior ports 75, 77 (FIG. 3) direct fuel into the rotary housing 64 through ducts 83, 85. The first duct 83 routs fuel to cause higher pressure H on the surface 81 of the rotors 78 and rotation in a first direction, for example direction 80 as shown. A pressure differential is created across each rotor 78 so that a low pressure L develops on the opposite side of each rotor 78 adjacent surface 79. This causes movement of the rotors 78 and in turn the housing 64. Alternatively (not shown), the second duct 85 may direct fuel to cause higher pressure on the opposite surface 79 of the rotors 78 to rotate the rotors 78 in the opposite direction, for example direction 82.

Fuel may be transported through the shaft 65 through one or more ducts formed therein. Alternatively, fuel may be moved through ducts or tubes within the rotary housing 64, but not within the shaft 65. In still a further embodiment, the fuel may be moved through the tubes or ducts exterior to the rotary housing 64 and move into the rotary housing 64 at some location through or adjacent to the rotary housing 64. In other words, the ducting of fuel may be through the shaft 65 or through other routes and should not be considered limiting to the depicted embodiments.

In operation, a fuel flow is commanded, for example from the full authority digital engine control (FADEC) (FIG. 4) or a supplemental control system in communication with the FADEC and also in communication with the ESHV to provide fuel flow to the rotary actuator assembly 60. Fuel is then routed to one or the other side of the shaft 65. This creates a force on the pairs of surfaces 79 or the pairs of surfaces 81 to cause rotation in the direction 82 or in the direction 80, respectively. The rotary housing 64 and the rotors 78 next move to a desired location causing the desired actuation of the one or more rows of vanes 32, 36, 40. Pressure of the fuel equalizes once the desired position of the rotary housing 64 is reached and the rotation position sensor 86 confirms the position of the rotary housing 64.

As shown in the view of FIG. 4, the clevis 66 extends from the rotary housing 64. The rotary housing 64 provides an arrangement so that all of the components causing movement of the clevis 66 are internalized. As opposed to prior art linear actuators, the rotary actuator assembly 60 inhibits contamination of the fuel and actuating components, such as pistons or rotating linear actuators, for example threaded rods, when these devices are in extended positions. The present embodiments maintain the components such as rotors 78.

Additionally, the rotors 78 have equal surface area on each surface 79, 81 that is acted upon by the pressurized fuel. Accordingly, the rotors 78 provide that equal torque may be applied in either direction 80, 82. As discussed previously, with pistons and heads, one surface area of the piston head is fully exposed to the fuel. However, the opposite side has a smaller exposed surface area due to the surface area covered by the cross-sectional area of the piston. Alternatively, instant embodiments provide equivalent surface areas to the fuel providing equal torque in either direction without compensating in other ways.

The rotary actuator assembly 60 also comprises a rotation position sensor 86. The rotation position sensor 86 may be a one channel or multiple channel rotary voltage transducer which provides readings, for example an output voltage, dependent upon the position of the rotary housing 64 during rotation of the rotary housing 64. The rotation position sensor 86 may provide the feedback signal or information to a full authority digital engine control (FADEC) or other flight controller so that when an adjustment to the vane position is made, the feedback loop provides information to the computer for verification of the position of the vanes, based on the position of the rotary housing 64.

Figure 5:
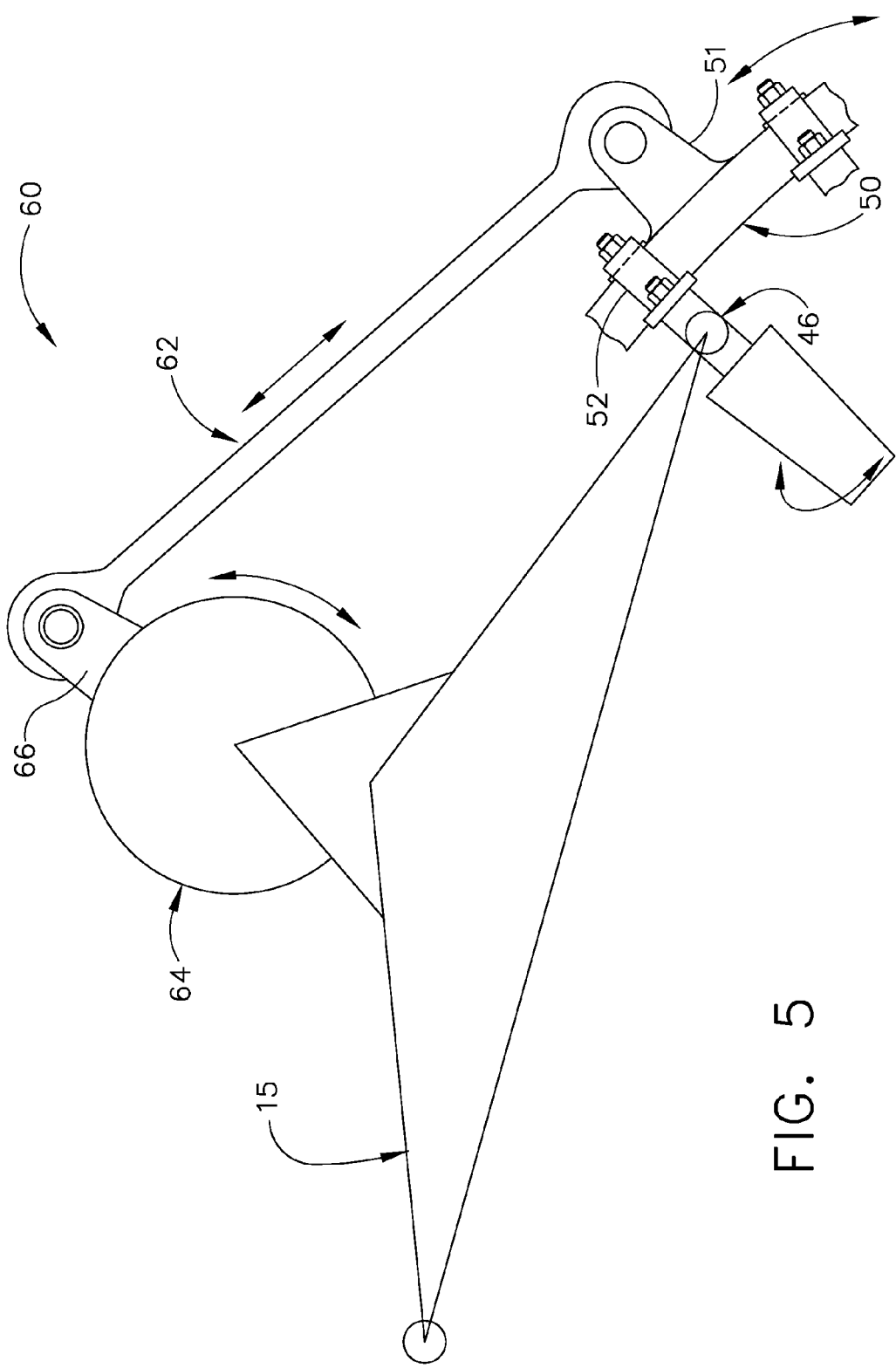
FIG. 5 is a free body schematic diagram representing the rotary and linear motion occurring to move the vanes.

Referring now to FIG. 5, a free body diagram is shown to depict the simplified motion of the rotary actuator assembly 60. The figure also depicts multiple double-headed arrows which correspond to movement of the components adjacent to the arrows. The rotary actuator assembly 60 provides a rotary motion of the rotary housing 64 shown with the adjacent curved double-headed arrow. As the clevis 66 moves in a partially circular motion, the actuator linkage 62 translates linearly as shown by the adjacent double-headed arrow. The actuator linkage 62 motion or translation moves the unison ring 50 circumferentially as shown with a double-headed arrow, which is subsequently converted to a rotational motion of the vanes 33, 37, 41. The rotation of the vanes 33, 37, 41 is shown by a double-headed arrow extending about the axis of mount 46. In the depicted diagram the rotary housing 64 is shown and is fixed at one or more locations. The actuator linkage 62 extends from the rotary housing 64 to the unison ring 50. The unison ring 50 includes a ring clevis 51 or other connection to connect the actuator linkage 62. The unison ring 50 is connected by the arm 52 to an exemplary vane. The rotary motion of the rotary housing 64 is converted to linear translation of the actuator linkage 62 and subsequent rotation of the vanes 33, 37, 41.

Figure 6:
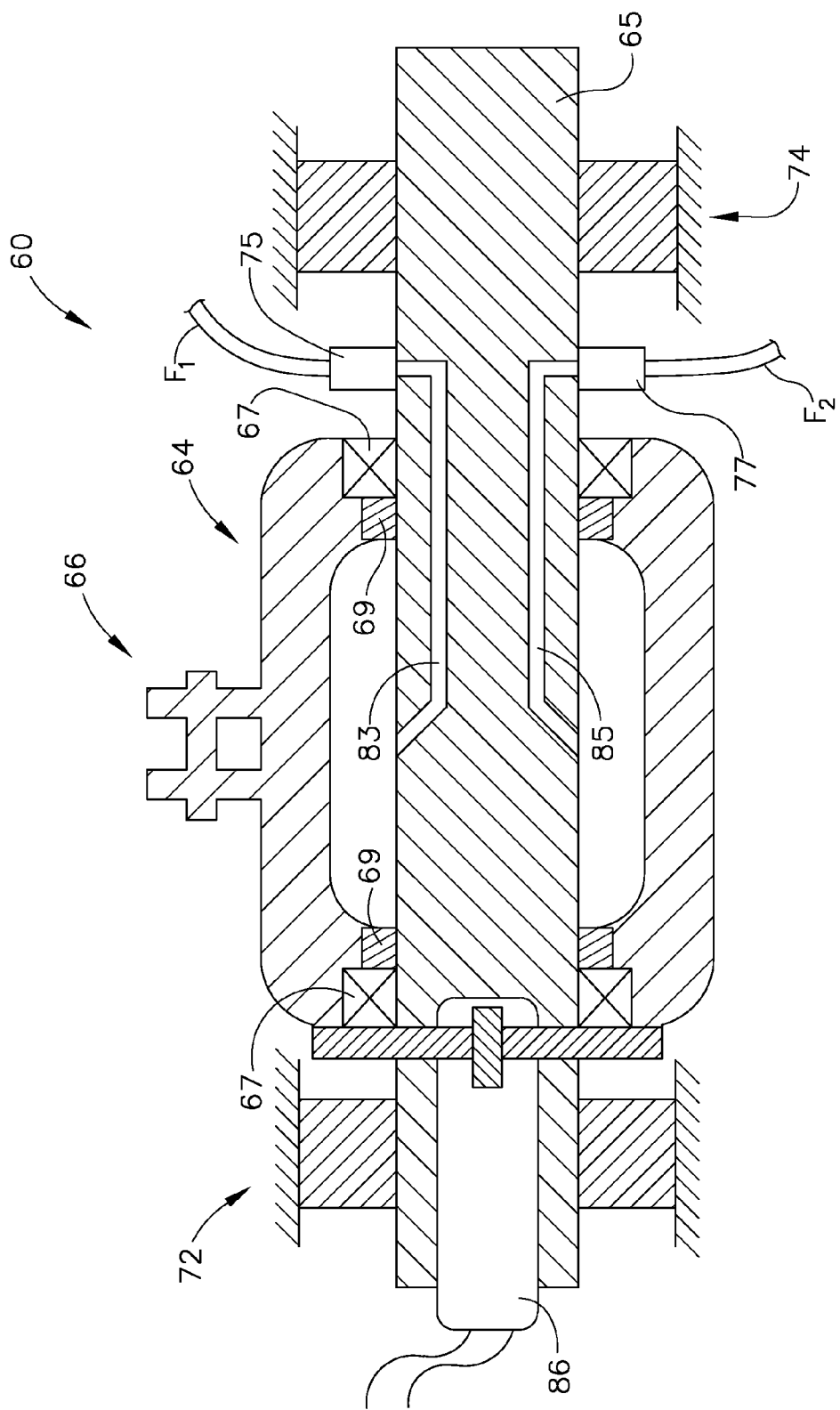
FIG. 6 is an axial cross-section view of an embodiment of a rotary actuator for control of variable geometry vanes mounted on a removable line unit; and, FIG. 7 is a second embodiment of an axial cross-section view of an embodiment wherein two rotary actuators are mounted as a single assembly mounted on a removable line unit.

Referring now to FIG. 6, an axial section view of one embodiment of a rotary actuator assembly 60 is shown. In this embodiment, a single actuation loop is provided, comprising one rotary housing 64, to create the rotary motion. The shaft 65 is fixed and bearings 67 are provided to allow the rotary housing 64 to rotate relative to the fixed shaft 65. Seals 69 may be located at the axial ends of the rotary housing 64 to inhibit spillage of fuel from the rotary housing 64 along the shaft 65. The control ports 75, 77 provide for input and output of fuel relative to the rotary actuator assembly 60. The fuel may pass from the control ports 75, 77 in a variety of manners, such as tubes, ducts, chambers or other passages 83, 85 into the rotary housing 64 to engage rotors 78 and cause rotation of the rotary housing 64 about the shaft 65. After causing rotation of the rotary housing 64, the fuel exits through the other of the control ports 75, 77. One skilled in the art will recognize that both of the control ports 75, 77 may be inputs and outputs at fuel lines $F_1$, $F_2$ and the flow direction of fuel is dependent on the desired motion of the rotary housing 64. A clevis 66 is shown for movement of one row of vanes, for example row 32. However, two or more clevises may be provided to control two or more rows of vanes.

At an end of the shaft 65, the rotation position sensor 86 is found. The rotation position sensor 86 is shown having leads which provide feedback information to a FADEC or other flight control system.

Figure 7:
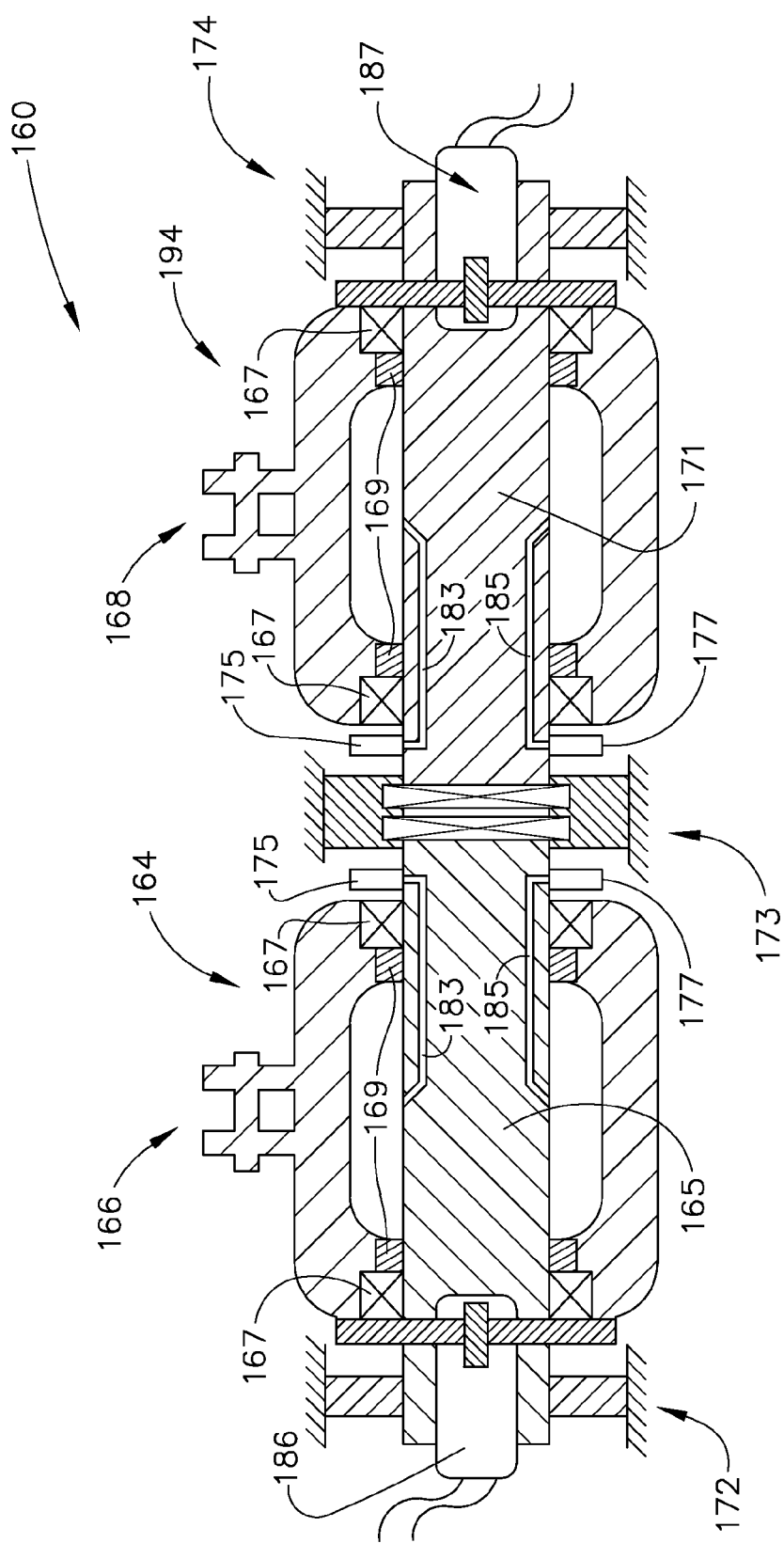

Referring now to FIG. 7, a second embodiment is provided wherein a rotary actuator assembly 160 may provide input to two or more rows of vanes. In this embodiment, as opposed to the previous embodiment, the rotary actuator assembly 160 includes two actuation loops comprising two or more housings 164, 194 to provide motion for two or more rows of vanes. For example, in the depicted embodiment, two clevises 166, 168 are provided to create movement of two rows of vanes. Additionally, and different from the previous embodiment, this embodiment provides independent motion of two rows of vanes. For example, one clevis 166 may control row 32 of inlet guide vanes 33 while the second clevis 168 may control row 36 of first stage vanes 37.

According to the instant embodiment, a first shaft 165 extends between a middle mount 173 and a first mount 172. A second shaft 171 extends from the middle mount 173 to a second mount 174. The first, second and middle mounts 172, 173, 174 are all fixed to a static structure, for example the engine casing 15 (FIG. 4). The shafts 165, 171 are fixed within the mounts 172, 173, 174 and therefore while two shafts 165, 171 are depicted, one shaft 165, 171 may be utilized for both housings 164, 194 according to alternate embodiments. Further, alternate embodiments may include embodiments wherein the one or more shafts 165, 171 rotate with the housings 164, 194.

Further, as with previous embodiments, the housings 164, 194 each comprise bearings 167 allowing rotation of the housings 164, 194 relative to the fixed shafts 165, 171. The housings 164, 194 also comprise seals 169 to inhibit fuel leakage from within the housings 164, 169. The seals 169 not exposed to extending and retracting shafts, which may pull contaminants back into the housings 164, 194. In prior art linear actuators, the extension of the piston exposes the piston to contaminants and the retraction of the piston may pull contaminants into the inside of the actuator if there is any failure of a seal. As a result of the instant embodiment there is less opportunity for wear due to contaminants and less likelihood of internal contamination of the actuator.

Each housing 164, 194 is shown with a clevis 166, 168. In some embodiments, each housing 164, 169 may have one clevis 166, 168 or may have more than one clevis 166, 168. For example, in the embodiment shown in FIG. 3, one rotary housing 64 may control the row 32 of inlet guide vanes 33 while the second rotary housing 64 may control row 36, 40 of first stage vanes 37 and second stage vanes 41. In order to provide such functionality, the two or more clevises 166, 168 located on one housing, for example housing 194 may need to be spaced apart in the engine axial direction. Variations of this non-limiting arrangement are also within the scope of the instant embodiments.

Further, at the ends of shafts 165, 171 adjacent the mounts 172, 174 are position sensors 186, 187. The position sensors 186, 187 as previously described, monitor housing position and provide a feedback to a controller to confirm position of the housings 164, 194, and therefore angular position of the vanes. The feedback may be provided to a FADEC or other controller which communicates with the FADEC.

Control ports 175, 177 are located along the rotary actuator assembly 160 to provide fuel to the housings 164, 194, and cause rotation thereof. The control ports 175, 177 are in fluid communication with the ducts 183, 185 to engage the rotors within the housings 164, 194 and cause desired arcuate motion.

Further, while multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A rotary actuator assembly for at least one stage of vanes within a gas turbine engine, comprising:
    at least one first actuator loop having at least one first fuel control port and at least one second fuel control port for fluid communication with at least one fuel supply;
    said at least one first actuator loop having a rotor and a first housing, said first housing rotating about a shaft in either of a first direction or a second direction, wherein said rotating is driven by fuel;
    a first actuator linkage operably connected to said first actuator loop; and
    a second housing rotating about said shaft and independently of said first housing;
    wherein said fuel develops a pressure differential across said at least one first actuator loop to drive said first housing and actuate said at least one stage of vanes.

2. The rotary actuator assembly of claim 1, wherein said actuator assembly is mounted in an engine axial direction.

3. The rotary actuator assembly of claim 1, wherein said at least one stage of vanes comprises multiple stages of vanes that are controlled independently by said first housing and said second housing.

4. The rotary actuator assembly of claim 1, wherein one of said first housing and said second housing cause movement of inlet guide vanes and the other of said first and second housings causes movement of at least one of first and second stage guide vanes.

5. The rotary actuator assembly of claim 1, wherein said first housing and said second housing have an arcuate path of movement.

6. The rotary actuator assembly of claim 1 further comprising a first rotational position sensor.

7. The rotary actuator assembly of claim 6, wherein said first rotational position sensor provides feedback to a full authority digital engine controller (FADEC).

8. The rotary actuator assembly of claim 6, wherein said first rotational position sensor provides positional feedback for said first housing.

9. The rotary actuator assembly of claim 1, wherein said first actuator linkage is movable in a first translational direction and a second translational direction with rotation of said first housing.

10. The rotary actuator assembly of claim 9, wherein movement of said first housing in said first direction and said second direction provide substantially equal torque.

11. The rotary actuator assembly of claim 1, wherein said first and second housings move externally to other components of said rotary actuator assembly.

12. The rotary actuator assembly of claim 1, wherein said first housing reduces contamination of fuel.

13. The rotary actuator assembly of claim 1 further comprising at least one clevis connected to each of said first and second housings.

14. The rotary actuator assembly of claim 1, wherein said multiple stages of vanes are located within a compressor.

15. The rotary actuator assembly of claim 1, wherein said first housing of said first actuator loop actuates an inlet guide vane.

16. The rotary actuator assembly of claim 15, wherein said second housing of said second actuator loop actuates first stage and second stage vanes.

17. A rotary actuator assembly for at least one stage of vanes, comprising: a mount; a first housing rotating about a shaft, a second housing rotating about the shaft, wherein the first housing and second housing rotate about the shaft independently and are rotatably connected to said mount;
    a rotor disposed in each of said housings and in fluid communication with a fuel supply; and
    an actuator linkage operably connected to said housing and said at least one stage of vanes.

18. A rotary actuator assembly comprising:
    a first housing rotating about a shaft, and a second housing rotating about the shaft, wherein the first housing and second housing each have independent rotating movement; a first linkage which is connected to said first housing, and a second linkage which is connected to said second housing, each of said first and second linkages translating when said first and second housings rotate; and
    said first and second linkages each moving a unison ring and causing independent rotation of first and second stages of vanes.

* * * * *